US007218618B2

(12) United States Patent
Greis et al.

(10) Patent No.: US 7,218,618 B2
(45) Date of Patent: May 15, 2007

(54) METHOD OF PROVIDING MOBILE IP FUNCTIONALITY FOR A NON MOBILE IP CAPABLE MOBILE NODE AND SWITCHING DEVICE FOR ACTING AS A MOBILE IP PROXY

(75) Inventors: Marc Greis, Irving, TX (US); Stefano M. Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 1061 days.

(21) Appl. No.: 10/198,599

(22) Filed: Jul. 19, 2002

(65) Prior Publication Data

US 2004/0013116 A1   Jan. 22, 2004

(51) Int. Cl.
*H04Q 7/00* (2006.01)
*H04Q 7/20* (2006.01)
*H04B 7/216* (2006.01)
*H04B 7/212* (2006.01)
*H04L 12/66* (2006.01)

(52) U.S. Cl. .................. 370/328; 370/331; 370/335; 370/342; 370/443; 455/435.2; 455/437; 455/439; 455/452.1

(58) Field of Classification Search ................ None
See application file for complete search history.

(56) References Cited

U.S. PATENT DOCUMENTS

| 6,195,705 | B1* | 2/2001 | Leung | 709/245 |
|---|---|---|---|---|
| 6,385,451 | B1* | 5/2002 | Kalliokulju et al. | 455/437 |
| 6,407,988 | B1 | 6/2002 | Agraharam et al. | |
| 6,711,147 | B1* | 3/2004 | Barnes et al. | 370/338 |
| 6,950,876 | B2* | 9/2005 | Bright et al. | 709/230 |
| 7,006,472 | B1* | 2/2006 | Immonen et al. | 370/332 |
| 7,039,404 | B2* | 5/2006 | Das et al. | 455/435.1 |
| 7,054,323 | B2* | 5/2006 | Viola et al. | 370/401 |

FOREIGN PATENT DOCUMENTS

| EP | 1 009 176 | 6/2000 |
|---|---|---|
| GB | 2 373 409 | 9/2002 |

OTHER PUBLICATIONS

Jiang et al., "Incorporating Proxy Services into Wide Area Cellular IP Networks", AT&T Labs Research, 2000.*
Database WPI, Derwent Publications Ltd., Document No. XP-002265772, Feb. 23, 2004, 2 pages.
Charles E. Perkins, Mobile IP Joins Forces with AAA, IEEE Personal Communications, Aug. 2000, pp. 59-61.

* cited by examiner

*Primary Examiner*—Chi Pham
*Assistant Examiner*—Melanie Jagannathan
(74) *Attorney, Agent, or Firm*—Squire, Sanders & Dempsey, L.L.P.

(57) ABSTRACT

A method of providing Mobile IP functionality for a non Mobile IP capable mobile node by a switching device by proxy, wherein a first address (HOA) and a second address (SA) are being allocated to said mobile node (MN), said method comprising the steps of: utilizing said first address (HOA) for non Mobile IP based communication legs by routing data to a home agent (HA) of a home network of said mobile node (MN); discovering an address of said home agent (HA) by said switching device; advertising said second address (SA) as care-of-address (CA) with respect to said first address (HOA) by said switching device to said home agent (HA); and utilizing said second address (SA) for Mobile IP based communication legs by routing data to said switching device (GGSN/MIP PROXY).

21 Claims, 4 Drawing Sheets

METHOD OF PROVIDING MOBILE IP FUNCTIONALITY FOR A NON MOBILE IP CAPABLE MOBILE NODE AND SWITCHING DEVICE FOR ACTING AS A MOBILE IP PROXY

BACKGROUND OF THE INVENTION

1. Field of the Invention

The present invention relates to a method of providing Mobile IP (MIP) functionality for a non Mobile IP capable mobile node. Further, the present invention relates to a switching device for acting as a Mobile IP proxy.

2. Related Background Art

Currently, a user equipment (UE) in a General Packet Radio System/Universal Mobile Telecommunication System (GPRS/UMTS) network keeps its Internet Protocol (IP) address for the whole duration of a session. Here, a session refers to the lifetime of a packet data protocol (PDP) context. This however implies that such user equipment is not able to move from one Gateway GPRS Support Node (GGSN) to another GGSN, even though it may have moved closer to a new GGSN. In the latter case, however, it would be more efficient to route the traffic to the mobile node through the new GGSN.

Moreover, a user equipment is currently provided with an IP address either dynamically, when a PDP context is activated, or statically at the subscription time. With dynamic IP addresses, the user equipment can get an IP address whenever it roams to a visited network and a GGSN will be allocated in the visited network. However, it needs to be noted that even in this case, a new PDP context has to be activated.

If push services besides multimedia services based on the UMTS IP Multimedia Subsystem (IMS) architecture are considered in this case, either dynamic modifications in the Domain Name Server (DNS) are needed (i.e. to be updated to the new IP address associated to the user equipment in the visited network) or the user equipment will not be reachable for such services unless the user equipment first contacts possible future correspondent nodes (CN).

SUMMARY OF THE INVENTION

Accordingly, it is an object of the present invention to overcome the problems of the prior art.

According to the present invention, this object is solved by providing a method of providing Mobile IP functionality for a non Mobile IP capable mobile node by a switching device by proxy, wherein a first address and a second address are being allocated to said mobile node, said method comprising the steps of: utilizing said first address for non Mobile IP based communication legs by routing data to a home agent of a home network of said mobile node; discovering an address of said home agent by said switching device; advertising said second address as care-of-address with respect to said first address by said switching device to said home agent; and utilizing said second address for Mobile IP based communication legs by routing data to said switching device.

Most preferably, said first address is a home address and said second address is a session IP address for use in a PDP context session. However, the present invention is not limited to this.

According to the present invention, the mobile node may have obtained the home IP address in the following manners.

Either, said home IP address has been allocated to said mobile node dynamically by having allocated said dynamic home IP address to said mobile node based on an home IP prefix corresponding to the mobile node's home network, when a packet data protocol context between said mobile node and said switching device has been firstly activated, said home IP prefix is contained in the user profile of said mobile node.

Or, said home IP address has been allocated to said mobile node statically by having given permanent static home IP address to said mobile node at subscription time, said permanent home IP address is contained in the user profile of said mobile node.

Thus, a mobile node may have a permanent home address allocated by the home network and supported by home agents in the home network, or may have a dynamic home address supported by home agents in the home network. The mobile node has also a session IP address allocated for PDP contexts, and such address is used as care-of-address with respect to the home address in the home network. Although there are the two possibilities that the session IP address associated to the PDP context is allocated dynamically by a switching device such as a GGSN when the PDP context is created, or that the address is a static session IP address allocated by the home network, e.g. UMTS/GPRS network, the present invention is applicable in both cases.

In the latter case, said mobile node may select at a first activation of a packet data protocol context between said mobile node and said switching device whether said static session IP address is to be used for said activation or whether another session IP address shall be allocated dynamically to said mobile node by said switching device for said activation.

However, regardless of the-type of the used session IP address (dynamic or static), if other PDP contexts between said switching device and said mobile node are activated, there is no need to assign a new session IP address by said switching device to said mobile node, i.e. no further Mobile IP procedure is needed.

One particularly advantageous effect of the present invention is that also a smooth handoff procedure between switching devices is possible so that a mobile node can always be best served.

Specifically, according to the present invention, the handoff procedure between two switching devices is executed for both of the above mentioned cases in the same way. Precisely, it is performed by the method according to the present invention including the further steps of: changing said switching device to a new switching device whenever respective conditions occur, wherein a new session IP address is generated for said mobile node by said new switching device; advertising said new session IP address as new care-of-address with respect to said home address by said new switching device to said home agent; and utilizing said new session IP address for the mobile IP based communication legs by routing data to said switching device.

In this handoff procedure, it is either possible to retrieve an address of said home agent by said new switching device from the old switching device, or to discover an address of said home agent by said new switching device.

Therefore, according to the present invention, a mobile node can always be served by a most suitable switching device.

Moreover, according to the present invention it is possible that data packets are sent from a correspondent node of a MIP based Internet to a non MIP capable mobile node. In an initial situation, the correspondent node may only know the home address as utilized by the home agent of the home network of the mobile node.

According to the present invention, by executing an optimizing procedure in this situation, the routing of data can be made fast and efficient.

Hence, this optimizing procedure is obtained by the method according to the present invention including the further steps of receiving data packets for said mobile node by said switching device; sending said data packets from said switching device to said mobile node; and detecting by said switching device whether an optimized routing of data is present, and if not, performing the further steps of exchanging a binding update message pair with a correspondent node originating said data packets, whereby a binding cache entry is created within said correspondent node; sending further data packets from said correspondent node to said session IP address as utilized by said switching device; and sending said data packets by said switching device to said mobile node.

That is, these above mentioned additional steps correspond to this optimizing procedure, which might particularly be of relevance when performed after a handoff procedure as mentioned above.

According to the present invention, the object may further be solved by providing a switching device for acting as a Mobile IP proxy, wherein a first communication network is based on the Mobile Internet Protocol and a mobile node within a second communication network communicates with said first communication network via said switching device, said switching device comprising: means having implemented functionalities which are specific to said second communication network and which functionalities are correspondingly provided; proxy means for providing Mobile Internet Protocol functionalities; and means for generating a dynamic home address for the mobile node from a home IP prefix, said home IP prefix contained in the mobile node user profile, wherein said switching device performs said second communication network specific functionalities towards said mobile node and said Mobile Internet Protocol functionalities towards said first communication network, thereby interworking the network specific system function of said mobile node into the Mobile Internet Protocol.

In this switching device according to the present invention, said network specific system function of said mobile node can be its specific mobility management protocols, thereby providing a Mobile Internet Protocol based handover functionality for said switching device.

According to the present invention, the change of a switching device such as a GGSN can be facilitated using the Mobile IP in a transparent manner for a mobile node, i.e. an implementation of the Mobile IP protocol is not necessary in the mobile node.

Furthermore, according to the present invention a mobile node of e.g. a UMTS/GPRS network is allowed to be allocated a home IP address without forcing the location of the switching device (e.g. GGSN) to be statically set in, e.g., the home network. At the same time, the mobile node can move to visited domains and perform regular GRPS/UMTS operations being unaware of the fact that a GGSN in a visited domain uses a new session IP address as care-of-address for the mobile node.

This also implies that the present invention provides a step in a smooth evolution from GPRS/UMTS-based mobility to Mobile IP, as it allows GPRS legacy terminals to be used in an efficient manner without modification, even though parts of the network have already migrated towards Mobile IP.

Moreover, the invention allows for dynamic allocation of IP addresses, and therefore supports all security requirements of Mobile IP. Specifically, this is achieved by the method according to the present invention, wherein said home address has been allocated to said mobile node dynamically by having generated said dynamic session IP address to said mobile node, when a packet data protocol context between said mobile node and said switching device has been firstly activated, said method comprising the further step of: advertising said dynamically allocated home address as home address with respect to said mobile node by said switching device to said home agent.

The present invention will become more apparent from the following detailed description of the embodiments presently considered as being preferred when taken in conjunction with the accompanying drawings.

DETAILED DESCRIPTION OF THE EMBODIMENTS

In the whole drawings, embodiments are considered by way of example where a home network is an UMTS operator that provides also Mobile IP services. Here, a non Mobile IP capable mobile node is considered which roams to a UMTS visited network.

The mobile node may be assigned by the home operator a home address HOA at subscription time that is supported by a home agent in the home network. That is, packets which are sent to the home address HOA are routed to the home network and in particular to a home agent of the operator. The manner in which the home agent is assigned to the mobile node is not essential for the present invention. However, all currently known methods therefor are applicable to the present invention, for example the Mobile IPv4 and the Mobile IPv6. Apart from that, any detailed description thereof is omitted here.

As a general remark, although examples according to Mobile IPv4/IPv6 are given hereinafter, it is expressly mentioned here that the present invention shall be applicable to at least these two and the mentioning of these as examples is in no way intended to be limiting.

The presently considered mobile node has a subscription with UMTS/GPRS service, and upon the activation of a certain PDP context for the first time (called primary PDP context), a sessionIP address SA is generated for the PDP context.

The UMTS subscription in a home location register (HLR) allows two possibilities for the mobile node to have such a session IP address.

The first possibility is to obtain a dynamic session IP address DSA. This means that when a PDP context is activated a dynamic IP address is generated for the PDP context. This method corresponds to the current UMTS/GPRS specifications and also the selection of the location of the GGSN is based on current mechanisms. In the present invention, the home address is given to the mobile node MN as address for the PDP context.

As a second possibility, the mobile node may obtain a static session IP address SSA. This address is contained in the user profile and when a PDP context is activated by the mobile node, it can select whether to activate this PDP context with the static session IP address SSA or with a dynamic session IP address DSA. In case the static session IP address SSA is used, the location of the GGSN is fixed. This means that it is located in the home network and particularly corresponds to a given IP link, meaning in turn that one of several GGSN's may be allocated, given these are all on this IP link to which the static session IP address corresponds.

In addition, in case the mobile node uses a dynamic session IP address, the mobile node may be given a dynamic home address created from a home IP prefix upon the activation of a certain PDP context for the first time (the so-called primary PDP context), the PDP context is given a session IP address SA. This home IP prefix is contained in the user profile and when a PDP context is activated by the mobile node, the GGSN can select according to network setting contained in the user profile or local network settings whether to assign to this PDP context the static home IP address SHOA or a dynamic session home IP address DHOA.

Based on the above assumptions, according to the present invention, whichever GGSN is whenever assigned to the present non Mobile IP capable mobile node MN, it uses the session IP address of the mobile node as the mobile node's care-of-address CA for its home address with respect to the home agent. Accordingly, packets are routed to the assigned GGSN by the respective session IP address in use. The assigned GGSN comprises proxy means which provide such Mobile IP functionalities. Towards the home agent, the assigned GGSN performs the respective functionalities which are specific to the network of said home agent, here, UMTS specific functionalities.

Specifically, the GGSN and in particular the therein included Mobile IP proxy means acts as an external binding cache to the mobile node MN, i.e. when packets are sent from the mobile node MN, the GGSN replaces the mobile node's home address HOA with the care-of-address CA and places the mobile node's home address HOA in the home address HOA destination option, as described in draft 13 of the Mobile IPv6 of the Internet Engineering Task Force IETF. Packets arriving at the GGSN which are destined for the mobile node MN will be forwarded to the mobile node MN after replacing the mobile node's session IP address SA used as destination address of the packets with the home address HOA, which is stored at the GGSN (MIP proxy, see below) at the time of a PDP context activation.

PDP Context Activation and Data Delivery

Figure 1:
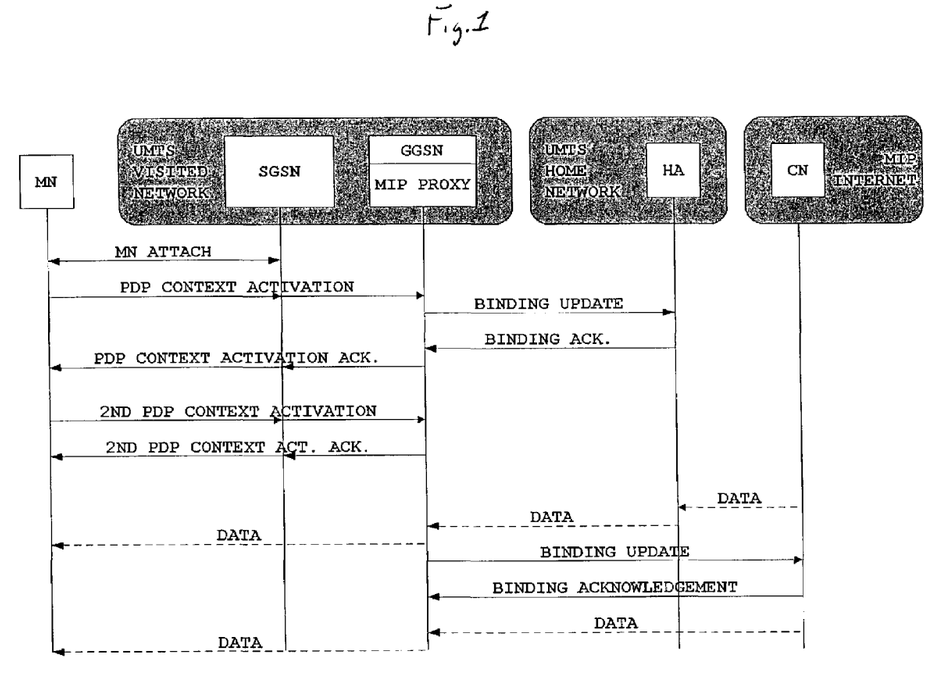
FIG. 1 shows a signaling diagram of a scenario where a dynamic session IP address is utilized for a PDP context activation procedure and for a data delivery procedure.

Referring now to FIG. 1, description is made for the case where the GGSN is assigned according to the use of a dynamic session IP address.

In an initial registration procedure, the mobile node attaches to a Serving GPRS Support Node (SGSN) of a UMTS visited network.

Upon the activation of a first PDP context with this SGSN and a corresponding GGSN having a Mobile IP proxy means, this GGSN generates a dynamic session IP address DSA for the mobile node. From this point on, this DSA will be used by the GGSN as care-of-address for the home address of the mobile node. The GGSN may also use a static home address (SHOA) contained in the mobile node user profile for the PDP context, or generate a dynamic home address (DHOA) for the PDP context based on the home IP prefix contained in the mobile node user profile. Precisely, it is the Mobile IP proxy means which performs such functionality. The GGSN performs a home agent discovery on behalf of the mobile node. This discovery procedure can e.g. be based on a Mobile IPv4 or Mobile IPv6 mechanism and so on. After the discovery, a "Binding Update/Binding Acknowledgment" message pair with respect to the DSA as CA is exchanged between the GGSN and the home agent HA. When a dynamic home address (DHOA) is used, additional message exchange may be needed between the GGSN and the home agent HA as defined for dynamic home address support in Mobile IP. Next, the GGSN acknowledges the PDP context activation and provides the home address HOA to the mobile node MN via the SGSN. Although the presently considered mobile node MN is non Mobile IP capable, it is henceforth ready for packet data delivery from the MIP Internet.

It shall be remarked here that other PDP contexts between the above mentioned mobile node MN, SGSN and GGSN will be activated by simply exchanging the "secondary PDP context activation/secondary PDP context activation acknowledgment" message pair as illustrated in FIG. 1. That is, the GGSN does not assign a new dynamic session IP address DSA to the mobile node MN. Thus, no further Mobile IP procedure is needed.

As mentioned above, the mobile node MN is now ready for data delivery. The data delivery from a correspondent node CN of the MIP Internet to the mobile node MN may at first be performed from the correspondent node CN to the home agent HA, since it is very likely that the correspondent node CN only knows the home address HOA for the mobile node MN to where the data packets are correspondingly sent. However, this applies only to the case where the home address is static (SHOA) and can be known by the correspondent node CN. According to the above mentioned binding procedure, the data packets are further sent from the home agent HA to the GGSN, and therefrom further to the mobile node MN. However, at this point the MIP proxy means of the GGSN detects that the data packet routing is not optimized. Hence, it exchanges a binding message pair with said correspondent node CN, thus creating a binding cache entry therein. That is, towards this correspondent node CN the MIP proxy means behave as a mobile node MN according to the Mobile IP. Thereafter, further data packets are delivered directly from the correspondent node CN to the GGSN including the MIP proxy means, and further to the non Mobile IP capable mobile node MN.

Figure 2:
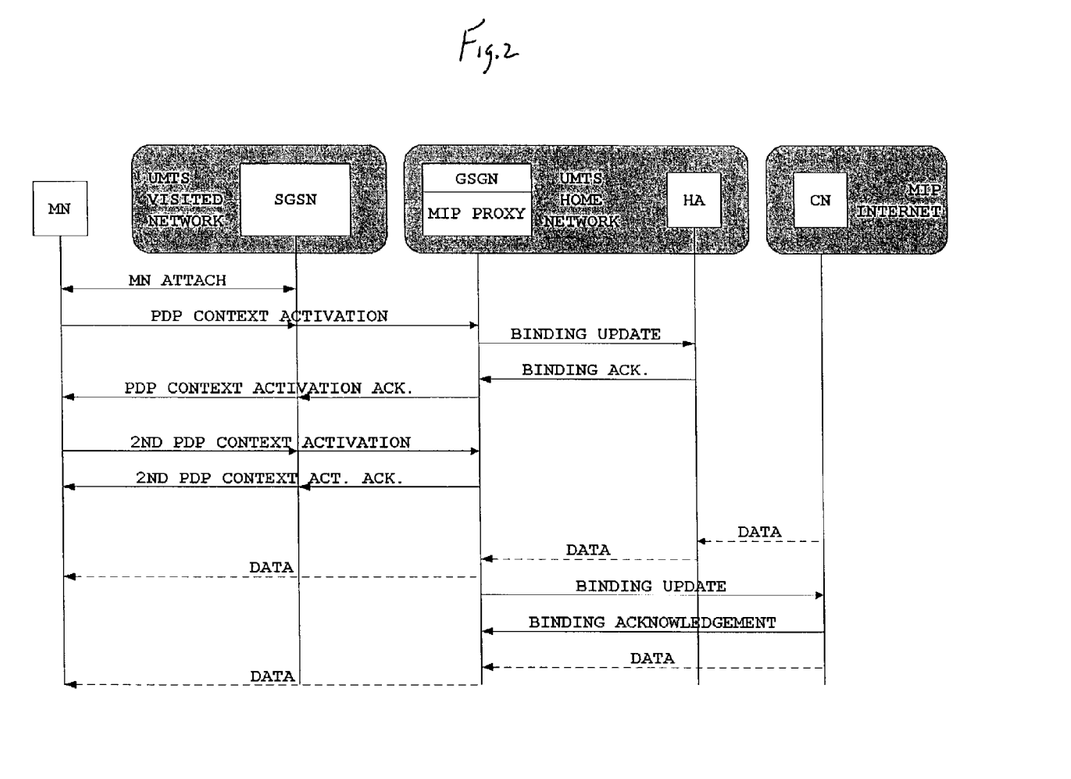
FIG. 2 shows a signaling diagram of a scenario where a static session IP address is utilized for a PDP context activation procedure and for a data delivery procedure.

Referring now to FIG. 2, description is made for the case where the GGSN is assigned according to the use of a static session IP address SSA.

After the attach of the mobile node MN to the SGSN of the visited UMTS network, a context activation via this SGSN is performed with respect to a GGSN in the mobile node's UMTS home network. The assigned GGSN lies on the IP link corresponding to the static session IP address SSA. This means that the assigned GGSN lies within the UMTS home network of the mobile node MN and not within the UMTS visited network. This also means that the GGSN does not assign a dynamic session IP address DSA to the mobile node MN, but uses the static session IP adress SSA contained in the user profile of the mobile node MN which can be retrieved by the SGSN from the HLR. That is, the Mobile IP proxy means of the GGSN uses this static session IP address SSA as care-of-address CA for the home address HOA of the mobile node MN. As is apparent from FIGS. 1 and 2, other procedures with respect to the use of a static session IP address SSA are in so far the same, as it is the static session IP address SSA which is used as care-of-address CA for the home address HOA and not the dynamic session IP address DSA. Apart from that, the remaining procedures of the cases depicted in FIGS. 1 and 2 correspond to each other for which reason any further detailed description thereof is omitted here.

Handover

Besides the above discussed procedures, the enabling of a smooth handoff procedure is presently considered as a particular advantage of the present invention.

Figure 3:
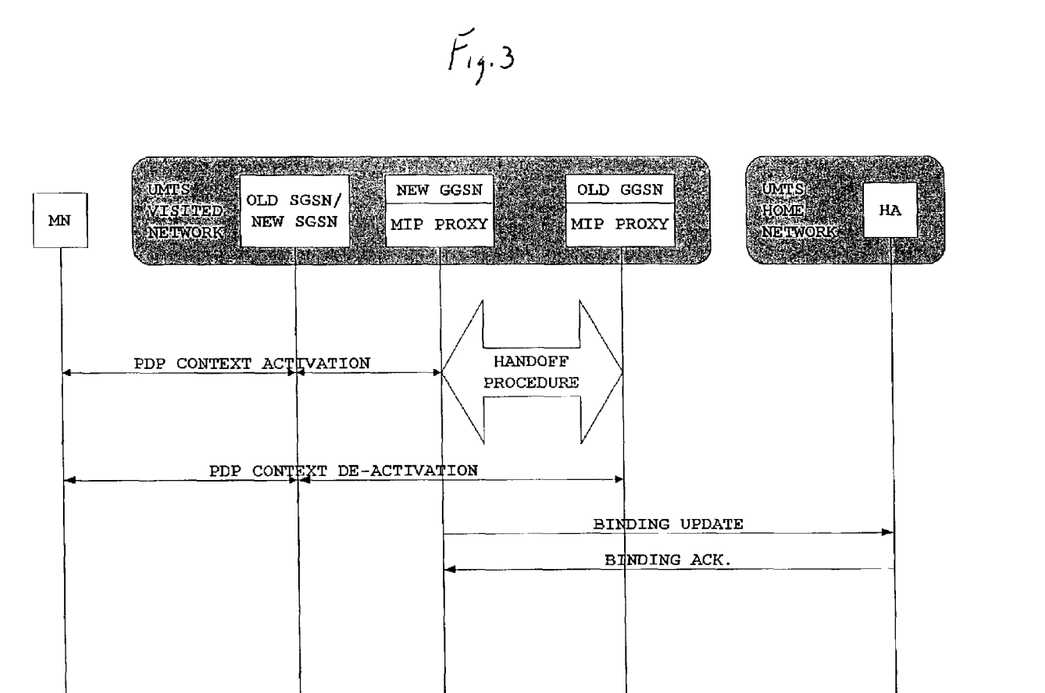
FIG. 3 shows a signaling diagram of a scenario where a handoff to a new GGSN as an example for a switching device is performed when a dynamic session IP address is utilized.
Figure 4:
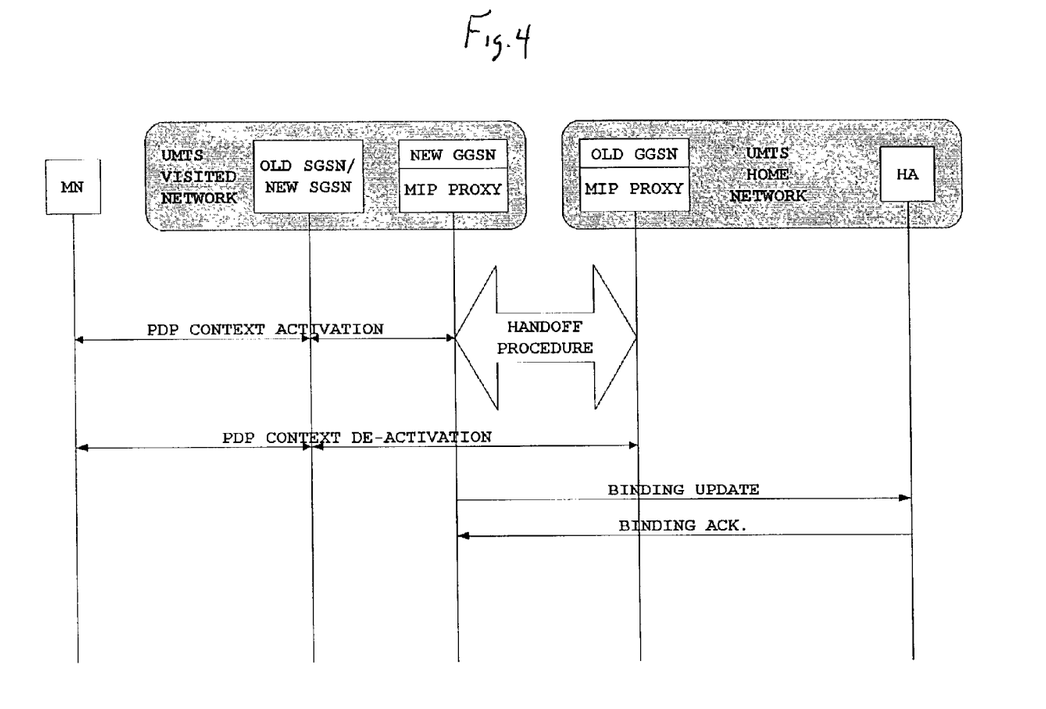
FIG. 4 shows a signaling diagram of a scenario where a handoff to a new GGSN as an example for a switching device is performed when a static session IP address is utilized.

A description for the corresponding procedures is provided by referring to FIGS. 3 and 4.

Specifically, FIG. 3 shows the case where a GGSN within the UMTS visited network according to a dynamic session IP address DSA has been assigned to the non Mobile IP capable mobile node MN. The reason why a GGSN shall be changed is not essential for the present invention, however, any reason and respective behavior of the contributing network elements is covered by the present invention.

For example, when the mobile node MN moves to a new area and it is then decided that a new GGSN would serve the mobile node MN better, the SGSN can be the same during the handoff. The reason is that since the new radio cell is under a new SGSN, the mobile node MN has already moved to it and only the GGSN is changed during the handoff.

As another example, there could be an OLD SGSN and a NEW SGSN when the GGSN handoff is decided before the mobile node moves, thus both GGSN and SGSN would be new.

Anyway, the starting point for the handoff procedure according to the present invention is that the "OLD" GGSN determines due to any reason (including a triggering from another element) that a handoff to a "NEW" GGSN is needed.

The handoff procedure which e.g. can be the fast handoff as defined by the Internet Engineering Task Force IETF then takes place with a transfer of the PDP context. The handling of the PDP contexts at handoff can be performed according to several possibilities. That is, the new ones can be created before the old ones are deactivated, it can be done vice-versa, or the two procedures can be done in parallel. Whatsoever, the NEW GGSN initiates the PDP context activation with the mobile node MN, and the OLD GGSN initiates the context de-activation with the mobile node MN, as illustrated in FIG. 3.

Next, according to the present invention, the NEW GGSN generates a new dynamic session IP address DSA for the PDP context activated by the mobile node MN and the Mobile IP proxy means uses this dynamic session IP address DSA as care-of-address CA for the home address HOA according to the aforesaid. There is no need that this new dynamic session IP address DSA is signaled to the mobile node MN. The address of the home agent can either be retrieved by the NEW GGSN from the OLD GGSN or the NEW GGSN can perform a new discovery procedure (e.g. to derive the address of the Home agent HA from the mobile node's home address). The NEW GGSN sends a binding update message regarding the new dynamic session IP address DSA to the home agent HA in order to advertise this new dynamic session IP address DSA as new care-of-address CA, and the home agent HA accordingly (or upon request) sends a corresponding binding acknowledgment message back to the NEW GGSN. Thus, the handoff to a NEW GGSN according to the present invention is essentially completed. However, the NEW GGSN can also send binding updates to the correspondent nodes CN, which may be known from the OLD GGSN's binding cache.

Moreover, FIG. 4 shows the case where a GGSN within the UMTS home network according to a static session IP address SSA has been assigned to the non Mobile IP capable mobile node MN. The handoff procedure is very similar to the above, except for the following.

While the OLD GGSN is in the UMTS home network according to the assignment with a static session IP address SSA, the NEW GGSN will be for sure in the UMTS visited network when the NEW GGSN is deemed to serve better the mobile node MN. This means nothing else than if a GGSN hand off procedure is performed where the OLD GGSN has been assigned according to a static session IP address DSA, the NEW GGSN will assign a dynamic session IP address DSA to the mobile node MN which will be used by the Mobile IP proxy means as care-of-address CA for the home address PA.

With respect to the handoff procedures shown in FIGS. 3 and 4, as mentioned above, it is not essential why the GGSN is to be changed. A GGSN change can be triggered by an element of the GPRS/UMTS network, including (but not limited to) a radio network controller RNC, a SGSN and the GGSN itself. The GGSN change may be triggered based e.g. on "GGSN routing areas", to which a certain set of RNCs and/or SGSNs may belong to, or based on resource/load balancing considerations in the GGSN, etc. Reference is made to corresponding specifications.

In order to initiate the GGSN change, the old GGSN sends a signal to the new GGSN. The message(s) which is (are) used to initiate the GGSN change may include:

The mobile node's home address HOA;
Quality-of-Service-related information about the PDP context(s) which are to be transferred;
Authentication-related information;
Policy-related information;
Charging-related information;
the address of the mobile node's home agent HA;
the address of the SGSN and/or RNC which is "covering" the mobile node MN; and
a binding cache for the relevant mobile node MN, which would contain the addresses of correspondent nodes CN.

The new GGSN performs resource availability checks, policy checks, etc., similar to the checks it would perform for new PDP contexts.

Other Embodiments

Regarding the signaling diagrams of FIGS. 1 through 4, the illustration is made simple for the sake of distinctness. However, as mentioned above, the embodiments depicted in FIGS. 1–4 are only intended for explanatory purposes and by no way limiting. For example, the present invention is as well applicable if any authentication-authorization-accounting-means (AAA) are implemented. Thus, the difference to the situations described along with FIGS. 1–4 is the additional signaling occurring due to the presence of AAA-means (authentication, authorization, accounting). While a respective charging authority AAAC would be present in the GGSN together with the MIP proxy means, an AAA visited authority AAAV and an AAA home authority AAAH would be present within the Mobile IP Internet. Hence, respective DIAMETER message pairs would be exchanged between these authorities which precede the binding message pair signaling. As two options, the binding signaling can be performed between the AAA home authority AAAH and the home agent HA or between the GGSN with the MIP proxy and the AAA charging authority AAAC and the home agent HA.

Switching Device

According to the present invention, there is provided a switching device for acting as a Mobile IP proxy, wherein a first communication network (MIP Internet) is based on the Mobile Internet Protocol and a mobile node MN within a second communication network (UMTS visited network) communicates with said first communication network via said switching device GGSN/MIP PROXY, said switching device GGSN/MIP PROXY comprising: means having implemented functionalities which are specific to said second communication network (UMTS visited network) and which functionalities are correspondingly provided; proxy means MIP PROXY for providing Mobile Internet Protocol functionalities; and means for generating a dynamic home address DHOA for the mobile node MN from a home IP prefix, said home IP prefix contained in the mobile node user profile, wherein said switching device GGSN/MIP PROXY performs said second communication network specific functionalities towards said mobile node MN and said Mobile Internet Protocol functionalities towards said first communication network MIP Internet, thereby interworking the network specific system function of said mobile node MN into the Mobile Internet Protocol.

Specifically, a switching device as, for example, a GGSN includes a Mobile IP proxy means for non mobile-IP capable mobile nodes. The system network is more efficiently used and older generation devices may be used with new Mobile IP based systems. That is, a Mobile IP proxy means in a switching device like a GGSN is employed so that a non Mobile IP capable mobile node may utilize next generation Mobile IP based networks.

Stated in other words, in order to allow non Mobile IP capable mobile nodes to work with a IP network where Mobile IP is the mobility protocol, a network element acts as a Mobile IP proxy means for a mobile node that is not capable of processing Mobile IP.

More specifically, the MIP proxy means implements all the functions specific to the network for which the mobile node has been designed and behaves as a normal network element for the mobile node. For example, if the mobile node is based on IS-95 or GSM, the MIP proxy means will behave respectively as an IS-41 or GSM MSC towards the mobile node.

Towards the network, the MIP proxy means performs Mobile IP specific functions such as sending binding updates and so on which would otherwise be performed by a Mobile IP capable mobile node.

In addition, the MIP proxy means can interwork the mobile node specific mobility management protocols to Mobile IP. This enables a Mobile IP based handover between switching devices such as GGSN's, which would be transparent for the mobile node.

As an embodiment of the present invention, a GPRS/UMTS GGSN (or IGSN, see 3GPP TS 23.923; in the following reference will be made to GGSN, though "GGSN" could be replaced by "IGSN" in all instances) acts as a Mobile IP proxy means for a mobile node which is not Mobile IP capable.

More specifically, the GGSN performs all GPRS-specific functions (PDP context activation, assignment of IP addresses, etc.) towards the mobile node, but towards the network, it performs Mobile IP specific functions such as sending binding updates and so on which would otherwise be performed by a Mobile IP capable mobile node. This enables a Mobile IP based handover between GGSN's, which would be transparent for the mobile node.

According to the above, the present invention provides a method of providing Mobile IP functionality for a non Mobile IP capable mobile node by a switching device GGSN/MIP PROXY by proxy, wherein a first address HOA and a second address SA are being allocated to said mobile node MN, said method comprising the steps of: utilizing said first address HOA for non Mobile IP based communication legs by routing data to a home agent HA of a home network of said mobile node MN; discovering an address of said home agent HA by said switching device GGSN/MIP PROXY; advertising said second address SA as care-of-address CA with respect to said first address HOA by said switching device GGSN/MIP PROXY to said home agent HA; and utilizing said second address SA for Mobile IP based communication legs by routing data to said switching device GGSN/MIP PROXY.

As is understood from the present description by those who are skilled in the art, the present invention can be applied to many technical fields, and changes and modifications may be effected to the presently preferred embodiments without departing from the scope of the appended claims.

The invention claimed is:

1. A method of providing Mobile Internet Protocol functionality for a non Mobile Internet Protocol capable mobile node by a switching device by proxy, said method comprising:

utilizing a first address for non Mobile Internet Protocol based communication legs by routing data to a home agent of a home network of said mobile node, wherein said first address and a second address are being allocated to said mobile node;

discovering an address of said home agent by said switching device;

advertising said second address as care-of-address with respect to said first address by said switching device to said home agent; and utilizing said second address for Mobile Internet Protocol based communication legs by routing data to said switching device.

2. The method according to claim 1, wherein said first address is a home address and said second address is a session Internet Protocol address for use in a PDP context session.

3. The method according to claim 2, wherein said home address has been allocated to said mobile node dynamically by having generated a dynamic session Internet Protocol address to said mobile node, when a packet data protocol context between said mobile node and said switching device has been firstly activated, said method further comprising:

advertising said dynamically allocated home address as home address with respect to said mobile node by said switching device to said home agent.

4. The method according to claim 2, wherein said session Internet Protocol address has been allocated to said mobile node dynamically by having generated said dynamic session Internet Protocol address to said mobile node, when a packet data protocol context between said mobile node and said switching device has been firstly activated.

5. The method according to claim 2, further comprising:
allocating staticaly said session Internet Protocol address to said mobile node statically by having generated a static session Internet Protocol address to said mobile node at subscription time, said static session Internet Protocol address is contained in the user profile of said mobile node, and
when utilizing said static session Internet Protocol address, the location of said switching device is within said home network of said mobile node and on the Internet Protocol link to which said static session Internet Protocol address corresponds.

6. The method according to claim 5, further comprising:
selecting by said mobile node selects at a first activation of a packet data protocol context between said mobile node and said switching device whether said static session Internet Protocol address is to be used for said activation or whether another session Internet Protocol address shall be allocated dynamically to said mobile node by said switching device for said activation.

7. The method according to claim 4, further comprising:
changing said switching device to a new switching device whenever respective conditions occur, wherein a new session Internet Protocol address is generated for said mobile node by said new switching device;
advertising said new session Internet Protocol address as new care-of-address with respect to said home address by said new switching device to said home agent; and
utilizing said new session Internet Protocol address for the mobile Internet Protocol based communication legs by routing data to said switching device.

8. The method according to claim 7, further comprising:
retrieving an address of said home agent by said new switching device from the old switching device.

9. The method according to claim 7, further comprising:
discovering an address of said home agent by said new switching device.

10. The method according to claim 5, further comprising:
changing said switching device to a new switching device whenever respective conditions occur, wherein a new session Internet Protocol address is generated for said mobile node by said new switching device;
advertising said new session Internet Protocol address as new care-of-address with respect to said home address by said new switching device to said home agent; and
utilizing said new session Internet Protocol address for the mobile Internet Protocol based communication legs by routing data to said switching device.

11. The method according to claim 10, further comprising:
retrieving an address of said home agent by said new switching device from the old switching device.

12. The method according to claim 10, further comprising:
discovering an address of said home agent by said new switching device.

13. The method according to claim 2, further comprising:
receiving data packets for said mobile node by said switching device;
sending said data packets from said switching device to said mobile node; and
detecting by said switching device whether an optimized routing of data is present, and if not, performing
exchanging a binding update message pair with a correspondent node originating said data packets, whereby a binding cache entry is created within said correspondent node;
sending further data packets from said correspondent node to said session Internet Protocol address as utilized by said switching device; and sending said data packets by said switching device to said mobile node.

14. The method according to claim 7, further comprising:
receiving data packets for said mobile node by said switching device;
sending said data packets from said switching device to said mobile node; and
detecting by said switching device whether an optimized routing of data is present, and if not, performing
exchanging a binding update message pair with a correspondent node originating said data packets,
whereby a binding cache entry is created within said correspondent node;
sending further data packets from said correspondent node to said session Internet Protocol address as utilized by said switching device; and
sending said data packets by said switching device to said mobile node.

15. The method according to claim 10, further comprising:
receiving data packets for said mobile node by said switching device;
sending said data packets from said switching device to said mobile node; and
detecting by said switching device whether an optimized routing of data is present, and if not, performing
exchanging a binding update message pair with a correspondent node originating said data packets, whereby a binding cache entry is created within said correspondent node;
sending further data packets from said correspondent node to said session Internet Protocol address as utilized by said switching device; and
sending said data packets by said switching device to said mobile node.

16. A switching device for acting as a Mobile Internet Protocol proxy, said switching device comprising:
a first unit configured to have implemented functionalities which are specific to a second communication network and which functionalities are correspondingly provided, wherein a first communication network is based on Mobile Internet Protocol and a mobile node within said second communication network communicates with said first communication network via said switching device;
a proxy unit configured to provide Mobile Internet Protocol functionalities; and
a generating unit configured to generate a dynamic home address for the mobile node from a home Internet Protocol prefix, said home Internet Protocol prefix contained in the mobile node user profile, wherein
said switching device performs said second communication network specific functionalities towards said mobile node and said Mobile Internet Protocol functionalities towards said first communication network to interwork the network specific system function of said mobile node into the Mobile Internet Protocol.

17. The switching device according to claim 16, wherein said network specific system function of said mobile node are its specific mobility management protocols to provide a Mobile Internet Protocol based handover functionality for said switching device.

18. The switching device according to claim 16, wherein said switching device is a Gateway GPRS Supporting Node.

19. The switching device according to claim 16, wherein said switching device belongs to a home network of said mobile node.

20. The switching device according to claim 16, wherein said switching device belongs to a visited network with respect to said mobile node.

21. A switching device for acting as a Mobile Internet Protocol proxy, said switching device comprising:

means having implemented functionalities which are specific to a second communication network and which functionalities are correspondingly provided, wherein a first communication network is based on Mobile Internet Protocol and a mobile node within said second communication network communicates with said first communication network via said switching device;

proxy means for providing Mobile Internet Protocol functionalities; and     means for generating a dynamic home address for the mobile node from a home Internet Protocol prefix, said home Internet Protocol prefix contained in the mobile node user profile, wherein     said switching device performs said second communication network specific functionalities towards said mobile node and said Mobile Internet Protocol functionalities towards said first communication network for interworking the network specific system function of said mobile node into the Mobile Internet Protocol.

\* \* \* \* \*